(12) United States Patent
Karppanen (10) Patent No.: US 9,785,332 B1
(45) Date of Patent: Oct. 10, 2017

(54) CONSERVING PROCESSING RESOURCES BY CONTROLLING UPDATES TO DAMAGED TILES OF A CONTENT PAGE

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 14/561,931

(22) Filed: Dec. 5, 2014

(51) Int. Cl.
- *G06F 3/0485* (2013.01)
- *G06F 3/0481* (2013.01)
- *G09G 5/34* (2006.01)
- *G06F 3/0484* (2013.01)

(52) U.S. Cl.
CPC .......... *G06F 3/0485* (2013.01); *G06F 3/0481* (2013.01); *G06F 3/04812* (2013.01); *G06F 3/04842* (2013.01); *G09G 5/346* (2013.01)

(58) Field of Classification Search
None
See application file for complete search history.

(56) References Cited

U.S. PATENT DOCUMENTS

| | | | | |
|---|---|---|---|---|
| 8,200,896 B2 * | 6/2012 | Schmieder | ............ | G06F 3/1462 345/530 |
| 2003/0025716 A1 * | 2/2003 | Colavin | ................. | G09G 5/346 345/684 |

* cited by examiner

*Primary Examiner* — Alvin Tan
*Assistant Examiner* — John M Heffington
(74) *Attorney, Agent, or Firm* — Knobbe, Martens, Olson & Bear, LLP (57) ABSTRACT

A browser divides content pages into tiles for display on a user device, and updates the tiles that become "damaged" as the result of user interactions or other events. The browser may decide whether and/or when to update a damaged off-screen tile based partly or wholly on a predicted likelihood that the user will scroll to that tile or that the tile will otherwise become visible on the user device. This prediction may, for example, be based on one or more of the following: (1) the distance of the off-screen tile from the visible display area, (2) the past browsing/scrolling behaviors of the user and/or other users. The decision of whether or when to update the damaged off-screen tile may also be based on the cost (in terms of processing resources) of updating the tile, as may be estimated based on the processing resources used to initially generate the tile. In addition, the decision may be based on a measure of visual impact associated with deferring the update.

19 Claims, 4 Drawing Sheets

CONSERVING PROCESSING RESOURCES BY CONTROLLING UPDATES TO DAMAGED TILES OF A CONTENT PAGE

BACKGROUND

When a user requests a web page via a browser, the browser usually displays only part of the requested web page due to display size constraints. Especially for a mobile device that has a relatively small screen, a substantial portion of the requested web page may remain outside the initial visible area displayed by the browser. The user may or may not scroll down to the portion that is not displayed. If the browser renders the entire page but the user does not scroll down and view the entire page, processing resources are used unnecessarily.

Some browsers divide a content page into a plurality of tiles, each of which can be updated independently of the others. Tiles visible in the display area of the browser can be called on-screen tiles. Tiles outside the display area of the browser can be called off-screen tiles. User interactions, animations, script executions, and other types of events can cause the appearance of a page to change, in which case some of the tiles become "damaged." Rather than updating the entire page, the browser may only update the damaged tiles. If off-screen tiles are updated but are not subsequently scrolled-to by the user, the processing resources used to update them are wasted. One known approach for addressing this problem is to determine whether to update the off-screen tiles based on their distances from the visible display area of the page.

BRIEF DESCRIPTION OF DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Some embodiments of the present disclosure address this problem by managing off-screen tiles differently from the on-screen tiles. Specifically, the browser may decide whether and/or when to update a damaged off-screen tile based partly or wholly on a predicted likelihood that the user will scroll to that tile or that the tile will otherwise become visible. This prediction may, for example, be based on one or more of the following: (1) the distance of the off-screen tile from the display area, (2) the past browsing/scrolling behaviors of the user, and (3) the past browsing/scrolling behaviors of other users who have accessed the page. The decision of whether or when to update the damaged off-screen tile may also (or alternatively) be based on the cost (in terms of processing resources) of updating the tile, as may be estimated based on the processing resources used to initially generate the tile.

The decision of whether or when to update a damaged tile may also be based on a measure of visual impact on the user's browsing experience. For example, if the off-screen tile damage is the result of an animation to which the user has not yet scrolled, the update may be deferred indefinitely unless and until the user scrolls to the animation; this is because the visual impact of starting the animation when the user scrolls down is minimal. As another example, if the damage is the result of an off-screen video that is synched with audio that is currently playing, the visual impact of stopping tile updates may be significant if and when the user scrolls down to the video; on the other hand, this visual impact may be reduced to an acceptable level by performing the updates less frequently than usual (e.g., every second, third or fourth frame of the video).

If the user scrolls to the damaged tile before it is updated, the update operation may be performed on demand (potentially resulting in rendering delay from the user's perspective). The process thus achieves a tradeoff between visual impact and conservation of processing resources.

In some embodiments, the foregoing is achieved via a browser-implemented process that selects or varies the update frequencies of specific tiles. Tiles of a content page are generated or identified by a renderer process of a user device or an intermediary system which interacts with a browser process of the user device. Tiles of a content page correspond to a logical or graphical representation of an area of the content page. For each tile, a cost to update the tile can be calculated as the page is initially rendered. Also, based on browsing history information and/or distance information, a probability that the tile will become visible can be calculated for each off-screen tile. The update frequency for the off-screen tile can then be selected or varied based on the cost to update the tile and the calculated probability to become visible (and/or other factors, such as a measure of the visual impact as described above). This process may be repeated for each off-screen tile periodically or in response to certain events, such as scrolling events. As off-screen tiles become damaged, a decision may be made whether (or when) to update them. For example, if the probability that a given off-screen tile will become visible is determined to be relatively low, and/or the tile's update cost is high, a low update frequency may be used; thus, if the tile becomes damaged, the task of updating it may be deferred indefinitely (resulting in an update frequency of zero) or for some period of time, reducing the likelihood that the user device's processing resources will unnecessarily be used to update the tile.

Specific embodiments and example applications of the present disclosure will now be described with reference to the drawings. These embodiments and example applications are intended to illustrate, and not limit, the present disclosure.

Figure 1:
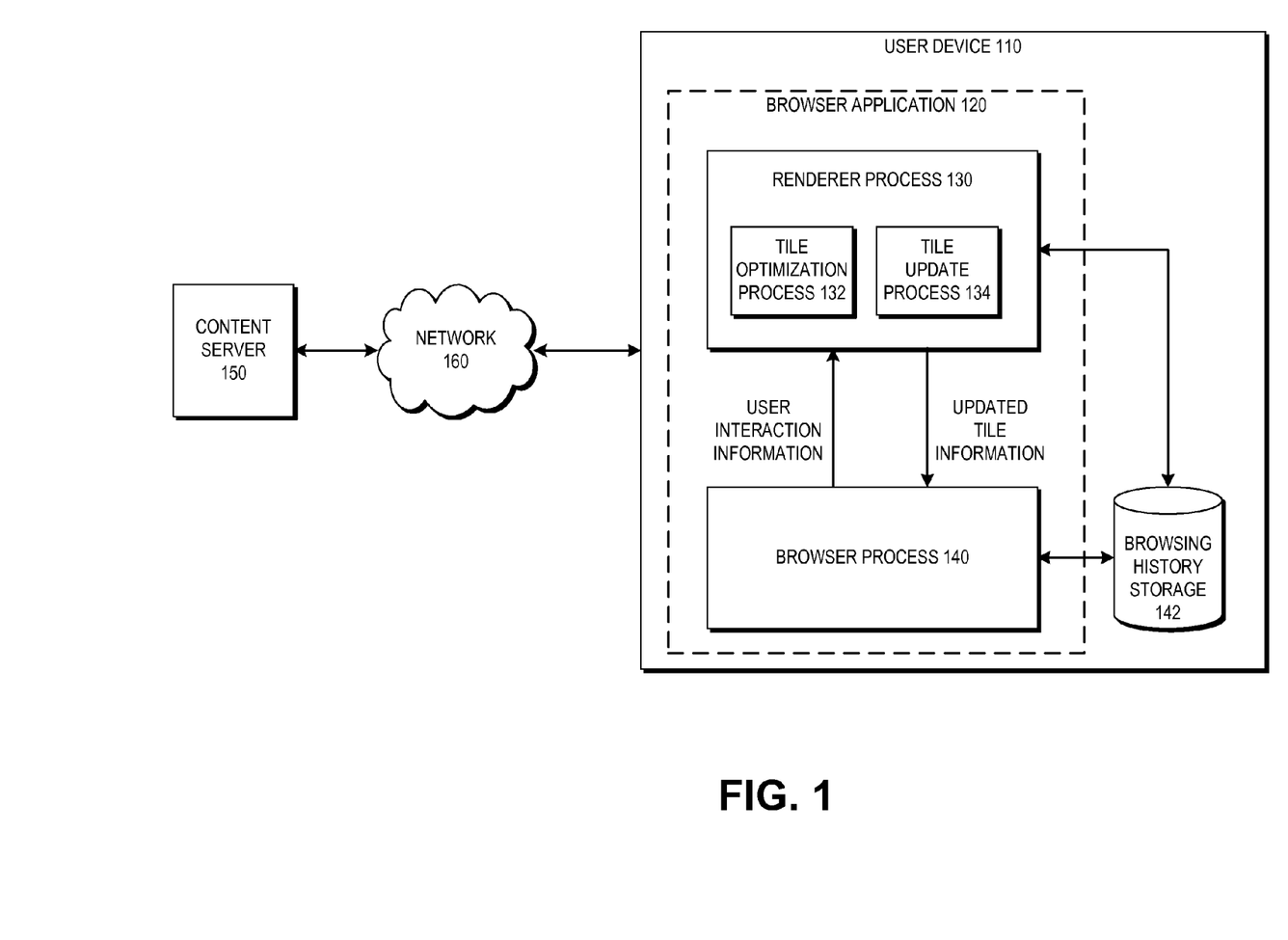
FIG. 1 is a block diagram depicting an illustrative environment for adjusting update frequencies of tiles of a web page or other content page.

FIG. 1 is a block diagram depicting an illustrative environment for adjusting update frequencies of tiles of a content page. The environment shown in FIG. 1 includes a user device 110, a content server 150 and a network 160. The network 160 may be a publicly accessible network of linked networks, possibly operated by various distinct parties, such as the Internet. The user device 110 communicates with the content server 150 via the network 160. In other embodiments, the network 160 may include a private network, personal area network, local area network, wide area network, cable network, satellite network, cellular telephone network, etc. or combination thereof, each with access to and/or from the Internet.

The user device 110 could be one of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 110 may execute a browser application 120 to communicate via the network 160 with other computing systems, such as content server 150, in order to request and display a content page.

Illustratively, a user may use a browser application 120 to request network-accessible content (e.g., content pages, images, video, etc.) hosted or provided by a content server 150. In response to a request from a user, the browser application 120 retrieves a requested content page from the content server 150. The browser application 120 includes a renderer process 130 that identifies and manages tiles of content pages received from the content server 150. The browser application 120 also includes a browser process 140 that interacts with the renderer process 130 and interacts with a display component of the user device 110 to display a content page.

The browser process 140 also can interact with a user interfacing component of the user device 110 to process a user command on a displayed content page. The user command may include a view manipulation command that alters the visible area of a content page presented on the user device 110. The view manipulation command may correspond to a command that modifies the set of visible (on-screen) tiles presented to the user. For example, the view manipulation command may include a command to zoom in, to zoom out, to scroll in a particular direction (e.g., up, down, left, right, or a combination of directions), to zoom in or out on a particular portion of the content page or a tile representing a portion of the content page, to increase or decrease the font size for text on the content page, and the like. The view manipulation command may be received or identified based on a mouse click, a text input, or a touchscreen input (e.g., a swipe, a pinch, a tap, double tap, a multi-touch action, etc.). In response to a view manipulation command, the browser process 140 updates the display of the user device 110. The browser process 140 is also operable to record user interaction information including view manipulation commands to the browsing history storage 142. The browsing history storage 142 is a local storage device of the user device that can store a history of user behavior associated with the browser application. In some embodiments, the browser process 140 is operable to provide user interaction information to the renderer process 130 promptly, in order to facilitate updates of off-screen tiles without substantial delay.

The renderer process 130 includes a tile optimization process 132 that can define or create a plurality of tiles that correspond to the content page. Tiles can refer to divided areas of the content page. Also, the tiles may include graphical representations, or images, of corresponding portions of the content page. For example, the tiles may include bitmaps, JPEGs, GIFs, tiffs, or other image file types that can include pictures or images of portions of the content page. In some cases, the tiles may represent portions of a snapshot or screen capture of the content page. The renderer process 130 may maintain and manage graphical representations of tiles that correspond to the content page. For each of the tiles of the content page, the renderer process 130 may decide whether to maintain its graphical representation and/or how to maintain its graphical representation. If the renderer process 130 maintains multiple sets of tiles for a content page, each set of tiles included in the multiple sets of tiles may represent or may be associated with a particular view of the content page. An example of a set of tiles that corresponds to a web page will be described referring to FIG. 4.

The tile optimization process 132 can define or create a plurality of tiles from a content page based on various factors including the structure of the content page, the configuration of the browser application 120 and specification of the user device 110. In some embodiments, the title optimization process 132 can parse the content page and generate a document object model ("DOM") or similar representation of the content page. Based on the DOM representation, tile optimization process 132 can define or create a plurality of tiles that correspond to the content page. In certain embodiments, the tile optimization process 132 may divide the content page into tiles which have a common size. For example, each tile may be 256×256 pixels, 256× 1600 pixels or 512×512 pixels, or the tiles may each by 1×1 inch or 2×2 cm, etc. Alternatively, the tiles may be defined using variable sizes such that certain content element, such as a text passage or image, is contained in a single title. Configuration of the browser application 120 and specification of the user device 110 may include data relating to screen size, amount of graphics memory, amount of random access memory (RAM), amount of storage space allocated to the browser 120, amount of RAM allocated to the browser 120, screen resolution, operating system version, zoom capability of the user device 102, supported font sizes, supported font types, DPI (dot per inch) of the user device 110 and the like.

The tile optimization process 132 is operable to calculate the update cost (rendering cost) of each tile. The cost to update a tile can be measured based on various factors including CPU cycles required, time required, power consumption, network bandwidth used, etc. Update cost of an on-screen tile can be calculated by analyzing browsing activities to generate current view of the content page in the user device 110. Update cost of an off-screen tile that has not been visualized in the user device 110 can be calculated by analyzing content corresponding to the tile. In certain embodiments, update cost of a tile in a content page can be calculated based on historical browsing information associated with the same content page. Update cost can also be estimated by, e.g., (1) multiplying the lengths of strings with a font-defined factor, (2) using surface-area based estimates for images that are already in decoded form in an image cache, and (3) adding up to full decode cost in case the image is not available in a cache (even if just a small portion of an image is needed, depending on format). Decoding cost is shared between all tiles requiring that resource. Update cost may also include non-drawing related items such as time needed to copy the texture data into GPU (Graphics Processing Unit) memory, if necessary.

The tile optimization process 132 is operable to calculate a "probability to become visible" for each tile. The probability to become visible of an on-screen tile is typically 100%. For each off-screen tile, the probability to become visible can be calculated based on various factors including distance from visible area, distance from visible tiles, the rate at which the page is currently being scrolled, the length of time that has transpired since the page was last scrolled, the probability of view manipulation commands, properties of possible view manipulation commands, the user's scroll history on the current page, and the user's scroll history generally. Illustratively, if all the other conditions are the same, a tile that is closer to the visible area can be determined to have a higher probability to become visible. Properties of view manipulation commands can include, for example, direction of scrolling, speed of scrolling, likelihood of scrolling, magnification of zoom-in command and speed of zoom-in. The probability of view manipulation commands can be estimated based on information stored in the browsing history storage 142. If a user tends to scroll to the bottoms of pages or to the bottom of this page at issue, an off-screen tile located below the visible area can have a relatively high probability of becoming visible. In some embodiments, an intermediary system may maintain, for specific pages, aggregated data regarding the page interactions of users who have accessed such pages, and may communicate such data (or information derived therefrom) to the browser application 120 when a page is loaded; thus, the probabilities to become visible calculated for a given user and page may depend on the browsing activities of other users who have accessed this page.

The tile optimization process 132 is also operable to determine or vary the update schedules or frequencies for the off-screen tiles (and in some cases, on-screen or partially on-screen tiles) in a content page. The update frequency or schedule for a damaged tile can be determined or varied based on various parameters including update cost (rendering cost) of the tile, probability to become visible (if off-screen), type of content corresponding to the tile, visual impact of the damage or change, delay threshold to respond to a user interaction, and available processing capabilities to update the tile. The screen refresh rate can also be considered; for example, if the probability of completing a redraw of a tile before the next refresh is small, the redraw may be postponed until the next frame update. In some embodiments, the tile optimization process 132 can calculate an optimization metric based on the abovementioned parameters to determine when to update the damaged off-screen tiles. Where a damaged tile is partially visible (i.e., partially off-screen), the decision of whether or when to update it may also be based on an assessment of whether, or the extent to which, the damaged portion is visible or will become visible.

In cases where a content element spans multiple tiles, these tiles may be scheduled to be updated at substantially the same time. This reduces or eliminates the negative visual impact associated with delays between the updates to different portions of the content element.

For example, if the damage to an off-screen tile is the result of a scrolling text marquee, the tile optimization process 132 can determine that there is no need to update the off-screen tile unless and until the user scrolls to the text marquee; this is because the visual impact on the browsing experience will be minimal if the text does not start scrolling until the text marquee becomes visible. In certain embodiments, an off-screen tile will not be updated (re-drawn) until the delay (expected based on computing capability and current load of the renderer process) to update the off-screen tile exceeds a predetermined threshold. As such, various policies to save resources can be considered to determine update (re-draw) frequency of off-screen tiles.

In some embodiments, the tile optimization process 132 is operable to adjust the quality levels of off-screen tiles based on the cost to update such tiles. For example, the resolution of off-screen tiles can be determined based on various factors including type of content corresponding to the off-screen tile, cost to update, available computing capacity, etc. Illustratively, if an off-screen tile corresponds to an advertisement banner that has a resolution of 240×240, the tile optimization process 132 can maintain a rendered tile (graphical representation of the tile) in a resolution of 120×120 to reduce the tile's update cost, and to thereby save computation resources.

The browser application 120 may include a tile update process 134 that updates off-screen tiles of a content page based on the updated frequencies determined by the tile optimization process 132. In response to view manipulation commands, the browsing process may obtain off-screen tiles of a content page that corresponds to an area that becomes visible according to the view manipulation commands. In certain embodiments, the tile update process 134 can provide off-screen tiles preemptively, as they are updated, to the browser process 140.

Figure 2:
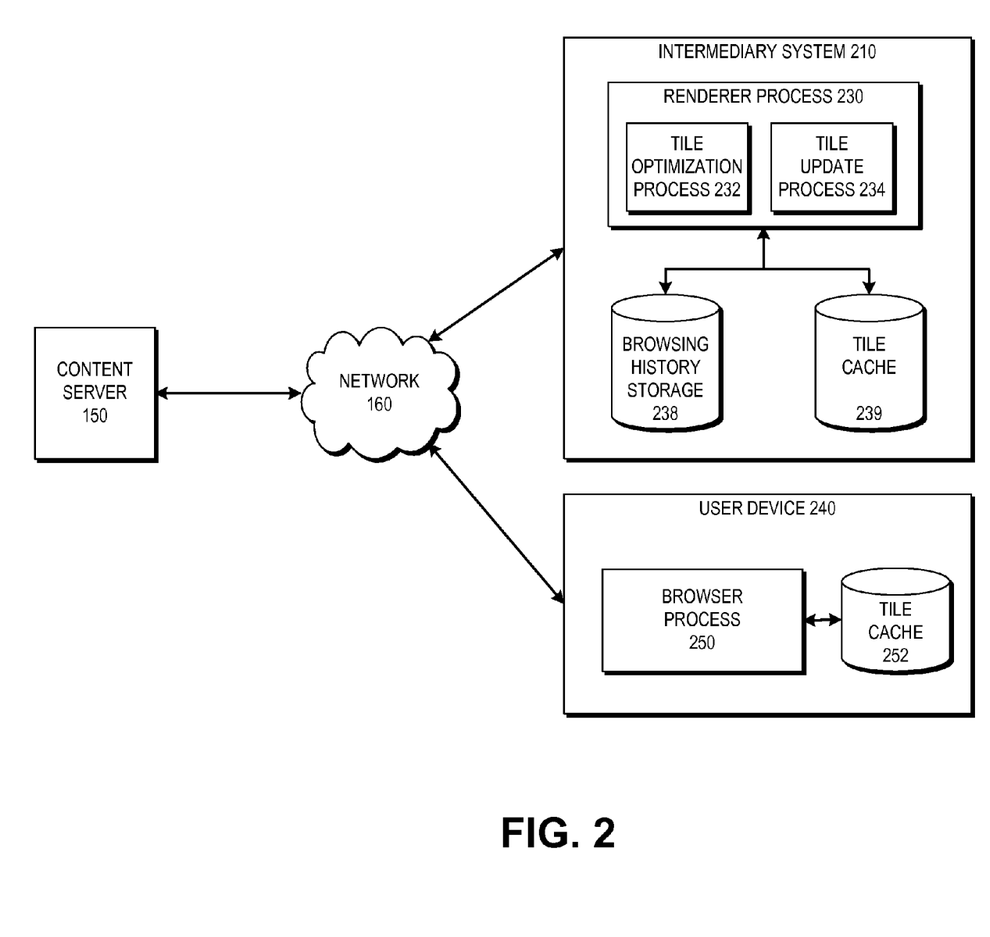
FIG. 2 is a block diagram depicting an illustrative environment with an intermediary system that is configured to adjust update frequencies of tiles of a content page.

FIG. 2 is a block diagram of an alternative embodiment in which the renderer process 230, including the tile optimization process 232, is implemented on an intermediary system 210 rather than on the user devices 240. By way of background, one method for reducing page load times is to offload some of the processing (including rendering) to an intermediary system (e.g., a proxy system) that sits logically between the user devices 240 and content server 150. The user device 240 may be associated with the intermediary system 210 or otherwise configured to request the content through, and receive rendered or partially rendered content from, the intermediary system 210 rather than communicating directly with the content server 150.

The intermediary system 210 may be a single computing device, or it may include multiple distinct computing devices, such as computer servers, logically or physically grouped together to collectively operate as an intermediary system. The components of the intermediary system 210 can each be implemented as hardware, such as a server computing device, or as a combination of hardware and software. In addition, the modules and components of the intermediary system 210 can be combined on one server computing device or separated individually or into groups on several server computing devices. In some embodiments, the intermediary system 210 may include additional or fewer components than illustrated in FIG. 2.

The user device 240 includes the browser process 250 that is operable to display a web page requested by a user. The browser process 250 is operable to interact with a user interfacing component of the user device 240 to process user commands. The user commands may include a view manipulation command that alters visible area of a content page presented on the user device 240. The browser process 250 can maintain a log of user commands, and may communicate these commands to the intermediary system. The log can be stored in a local storage of the user device 240 and/or in the browsing history storage 238 of the intermediary system 210. Features of the browser process 140 described in reference to FIG. 1 can be implemented by the browser process 250 with appropriate modification. The intermediary system 210 may maintain, in its local storage, a representation of the content page as currently displayed on a user device 240, and may use this local representation to calculate probabilities of tiles becoming visible.

With continued reference to FIG. 2, the intermediary system 210 includes a renderer process 230 that interacts with the browser process 250 to display a requested web page in the user device 240. The renderer process 230 includes a tile optimization process 232 and a tile update process 234. The tile optimization process 232 is configured and operable to implement features of the tile optimization process 132 described above in reference to FIG. 1. Illustratively, the tile optimization process 232 can create or generate a plurality of tiles that collectively represent a content page. The created tiles may be logical representations of areas of the page and may include graphical representations of the corresponding areas.

The tile optimization process 232 can calculate the probability to become visible for each of tiles, as described above. To calculate the probability to become visible, the tile optimization process 232 can analyze information stored in the browsing history storage 238. When information stored in the browsing history storage 238 indicates that the user of the user device 240 tends to input view manipulation commands such as scrolling and zooming, off-screen tiles may be determined to have relatively high probabilities to become visible. The probability of an off-screen tile becoming visible can be calculated based on various factors including distance from visible area, the number of neighboring on-screen tiles, association with on-screen tiles and type of content corresponding to the off-screen tile, the past scrolling behaviors of others who have accessed the same page, etc.

The tile optimization process 232 is also operable to calculate the update cost (rendering cost) of each tile. Cost to update a tile can be measured by various factors including CPU cycles required, GPU (graphics processing unit) cycles required, memory used, time required, power consumption, network bandwidth, and amount of network communication to update the tile. The structure of a page can be parsed and analyzed to measure cost to update tiles of the web page. In some embodiments, the tile optimization process 232 is also operable to measure resources used to generate a tile and the update cost of tile can be determined based on the measured resources. For example, update cost of each tile can be determined by measuring resources used when a content page is initially rendered. In some embodiments, the tile update frequencies (or decisions whether to update damaged tiles) can be based on update cost alone, without regard to tile content. For example, a determination may be made not to update one or more damaged off-screen tiles due to the high update cost associated with the damaged tiles.

The tile optimization process 232 is further operable to determine or regulate update frequencies of off-screen tiles. If there is no constraint on available resources, off-screen tiles may be kept up to date with the same frequency as (visible) on-screen tiles. Update frequencies of off-screen tiles can be determined or adjusted to maintain a balance between user experience and available computing resources. In certain embodiments, the update frequency of an off-screen tile can be determined based on various factors including the update cost (rendering cost) of the tile, probability to become visible, type of content corresponding to the tile, delay threshold to respond a user interaction, latency to update the tile, time interval from the last update, and available processing capabilities to update the tile. In determining whether or when to update damaged off-screen tiles, the tile optimization process 232 may also consider the cause of the damage: for example, as explained above, tile updates may be deferred indefinitely when the damage is cause by an animation that is currently entirely off-screen.

The tile update process 234 is operable to render (update) tiles of a content page based on the timing or deferral decisions made by the tile optimization process 232. Updated tiles can be sent promptly to the browser process 250 or can be stored in the tile cache 239. The browser process 250 may respond promptly to a user interaction by utilizing the pre-rendered tiles generated by the renderer process 230. The user device can include the tile cache 252 that can store current and/or updated tiles.

The tile optimization process 232 of FIG. 2 can operate substantially as described above for the tile optimization processes 132 of FIG. 1. Also, the browser process 250 of FIG. 2 can operate substantially as described above for the browser process 140 in FIG. 1.

Figure 3:
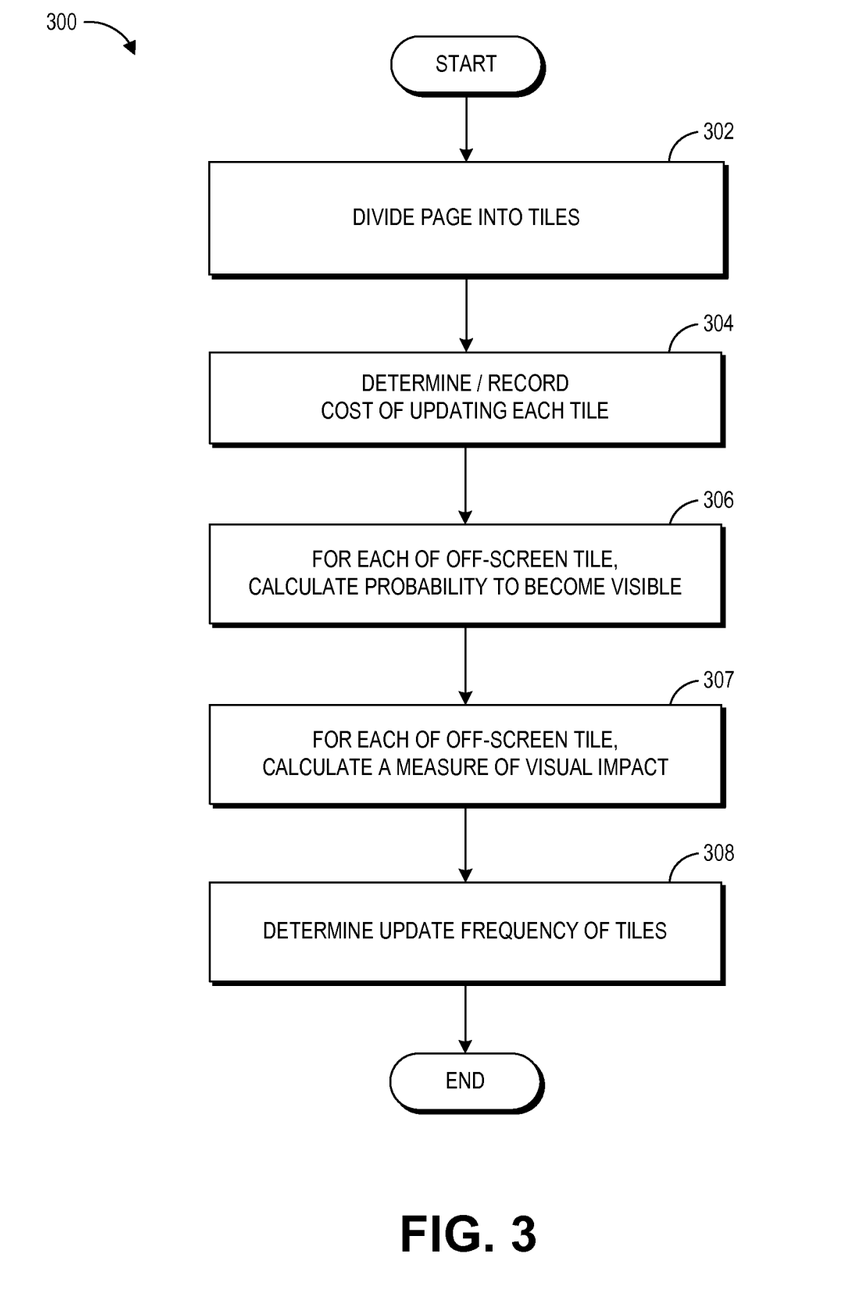
FIG. 3 is a block diagram illustrating processes of adjusting update frequencies of tiles of a content page.

FIG. 3 is a block diagram illustrating process 300 of adjusting or varying update frequencies of tiles of a page. The process 300 can be implemented by any computing component that can access a content page and identify one or more tiles of the content page. For example, the process 300, in whole or in part, can be implemented by a user device 110 comprising a tile optimization process 132 or by an intermediary system 210 that includes a tile optimization process 232. Processes represented by each blocks in FIG. 3 can be conducted in parallel or in different orders.

The tile optimization process, at block 302, divides a web page into a plurality of tiles. In some embodiments, a web page can be divided into an array of small tiles (e.g., 256×256 pixels or 256×1600 pixels) that have the same size or resolution. The size or resolution of the tiles may be determined based on configuration data (e.g., a screen size or screen resolution) of a user device. In other embodiments, the tile optimization process can divide a page into tiles that vary in size and/or shape. The sizes and shapes of the tiles can be selected based on various factors such as configuration of a user device, structure of the page, type of embedded resource in the page, etc.

At block 304, for each of the tiles, a cost of updating can be determined and recorded. The cost of updating a tile can be measured by various parameters such as CPU cycles, GPU cycles, required time, required power consumption, memory required, required data communications, etc. In some embodiments, the task of measuring the cost includes measuring the cost in terms of visual impact on the user, as described above.

At block 306, the tile optimization process can determine the probability to become visible for each of the off-screen tiles. Probability to become visible can be calculated based on various factors including distance from visible area, probability of view manipulation commands (such as scrolling actions), and properties of possible view manipulation commands. The probability to become visible can be a user specific metric that reflects historical browsing information of a specific user. In some embodiments, the probabilities to become visible are calculated without use of any browsing history data; for example, they may be calculated based solely on their distances from the browser's display area.

At block 307, the tile optimization process 132, 232 can calculate a measure of visual impact for each of the off-screen tiles. The measure of visual impact is a metric that can represent significance of visual change (damage) of the off screen tiles and thereby can represent a user's browsing experience relating to the off screen tiles. The tile optimization process 132, 232 can calculate the measure of visual impact based on various factors including ratio of damaged (changed) area in the off-screen tiles, types of content in the off-screen tiles, rate of change associated with a content (object) in the off-screen tiles, etc. In some embodiments, the measure of visual impact or the probability to become visible can be calculated or updated for a subset of the off-screen tiles in the content page.

The following are examples of some additional ways the visual impact can be measured or estimated: (1) use the GPU or CPU of the user device to compare the bitmaps (e.g., using a shader program to compare the bits of pixels); partial sampling can be used to reduce workload (e.g., check every nth pixel using a pattern); (2) compare the text string content of the elements drawn; (3) compare the coordinates of the elements drawn; (4) compare input parameters, such as CSS style changes; (5) compare time spent rasterizing; (6) use average contrast as a factor to measure the visibility of the changes; (7) use tile size as a factor to measure visibility of changes (larger tiles generally have a higher impact); (8) determine whether another semitransparent/translucent layer occludes the content, making it more difficult for the user to see the differences; (9) determine whether screen or neighboring tiles have eye-catching features (e.g., blinking animation or video), which would reduce the visible impact of other areas if their frequency/quality is reduced (attention goes to the changing area); (10) determine whether any recent touch or mouse events have occurred in the area of the tile, in which case the visual impact may be more significant; (11) if deciding to skip a frame, determine whether a touch/mouse event occurred on the tile afterwards (users typically tend to touch "broken" areas on the screen or scroll back and forth to make the problem go away); if yes, increase the visible impact measurement, thus lowering the likelihood of skipping frames. Any combination of the foregoing methods may be used.

At block 308, the tile optimization process can select or vary update frequencies of the off-screen tiles. In some cases, this is accomplished by merely determining (e.g., periodically or in response to an event trigger) whether or not to defer an update to a damaged tile; in other words, the update frequencies may be varied without explicitly calculating update frequency values. In some embodiments, some of the off-screen tiles may not be kept up to date based on various browsing policies. For example, if a user specifies priorities or importance levels of various types of content, a tile that does not contain an important content type may not be updated at all. In some embodiments, the update frequency of an off-screen tile can be determined based on various parameters including update cost (rendering cost) of the tile, probability to become visible, type of content corresponding to the tile, delay threshold to respond a user interaction, and available processing capabilities to update the tile. In certain embodiments, the update frequencies of off-screen tiles may be managed to meet a predefined delay threshold. For example, even if the probability of an off-screen tile becoming visible is low, a relatively high update frequency may be selected if the time required to update the tile is high, such that negative user experiences are avoided. In certain embodiments, if there are a plurality of (damaged) off-screen tiles, the tile optimization process can determine an order and/or priority for updating the plurality of off-screen tiles based on various factors associated with these tiles, including update cost (rendering cost), probability to become visible, type of content corresponding to the tile, delay threshold to respond a user interaction, and available processing capabilities.

Figure 4:
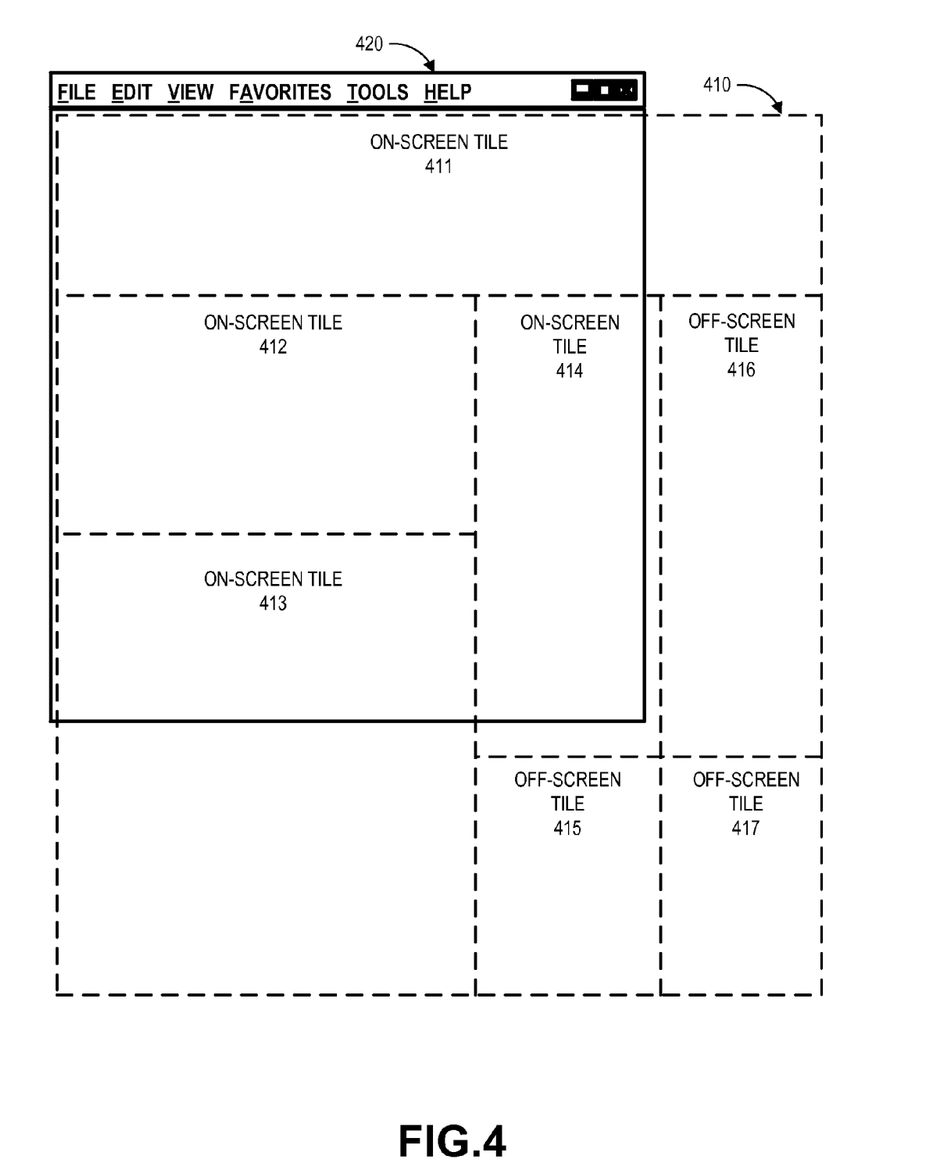
FIG. 4 illustrates an example of a set of tiles that corresponds to a web page.

FIG. 4 illustrates an example of a set of tiles that corresponds to a web page 410. Though all tiles of the web page 410 are rectangular in FIG. 4, tiles of various shapes may be defined for a web page. For example, if there is a non-rectangular animation component in the web page, a portion of the webpage that corresponds to the non-rectangular animation component can be defined as a single tile. In some embodiments, if there are areas of the content page that change synchronously or include identical animation content, the areas can form a single tile even though they are separated from each other. In some embodiments, a web page can be divided into a plurality of layers of tiles. For example, a web page can be divided into a layer of text and a layer of images. In certain embodiments, there can be tiles which are superimposed on, or which overlap with, other tiles.

In response to a request to display the web page 410, the browser 420 processes content of the web page 410 and generates an initial view of the page 410 as shown in FIG. 4. The initial view includes four on-screen tiles (on-screen tiles 411-414) and three off-screen tiles (off-screen tiles 415-417). Properties of the initial (default) view may depend on whether the user device is a mobile device (e.g., a smart phone or tablet) or a full-size device (e.g., a laptop or desktop computer).

The on-screen tile 411 and on-screen tile 413 are visible in the browser 420 in part. On-screen tile 411 is fully visible in the browser 420. Visual (graphical) representations of the on-screen tiles can be maintained up to date in substantially real time. The update frequencies of the on-screen tiles can be higher than those of the off-screen tiles.

As the off-screen tile 415 and off-screen tile 416 have at least one neighboring on-screen tile (on screen tiles 413, 414), those may have a higher probability than off-screen tile 417 to become visible in the browser 420 according to a user request to scroll down/right on the page 410. Therefore, update frequencies the off-screen tiles 415, 416 can be higher than that of the off-screen tiles 417. In some embodiments, when the off-screen tile 417 has a probability to become visible lower than a predetermined threshold, a render service can determine that the graphical representation corresponding to the off-screen tile 417 should not be updated.

Measuring Visual Impact Associated with Deferred Updates

As mentioned above, the decision of whether or when to update a damaged off-screen tile may be based partly or wholly on a measure of visual impact on the browsing experience. For example, if the off-screen tile damage is the result of an animation to which the user has not yet scrolled, the visual impact of delaying or skipping the update may be minimal; this is because the user ordinarily will not care if the animation does not begin to play until the user scrolls down to it.

In some embodiments, the tile optimization process 132, 232 may measure the visual impact associated an animation, video, or other type of varying content by measuring the change in content from frame-to-frame. For example, if the content is a video that includes audio, the tile optimization process may compare the first few frames to assess how much the content changes from frame-to-frame. The rate of change of content then may be used to select, for the tiles corresponding to the video, a tile update frequency corresponding to every N-th frame. For example, if the rate of change is relatively low, N may be set to a relatively high value, such as four or five, such that updates are made less frequently to the off-screen tiles associated with the video.

It will be appreciated by those skilled in the art that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored assume in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method of conserving processing resources used to render content pages, the method comprising:
as implemented by one or more computing devices configured with specific computer-executable instructions,
identifying a plurality of tiles of a content page requested by a user device;
identifying an off-screen tile among the plurality of tiles, the off-screen tile corresponding to a portion of the content page outside a visible area of the user device;
for the identified off-screen tile, calculating a probability that the off-screen tile will become visible;
calculating a measure of an amount of computing resources needed to update the off-screen tile;
selecting a timing with which to update the off-screen tile based at least partly on the probability that the tile will become visible and the measure of the amount of computing resources; and
updating the off-screen tile based on the selected timing.

2. The computer implemented method of claim 1, wherein the probability is calculated based at least partly on past page scrolling behaviors performed on the user device.

3. The computer implemented method of claim 1, wherein the probability is calculated based at least partly on past page scrolling behaviors performed by users on other user devices while accessing the content page.

4. The computer implemented method of claim 1, wherein selecting the timing with which to update the off-screen tile comprises selecting an update frequency for updating the off-screen tile.

5. The computer implemented method of claim 4, further comprising:
maintaining a graphical representation of the off-screen tile, the graphical representation being updated according to the selected update frequency; and
in response to a view manipulation command that will make the identified off-screen tile visible on the user device, causing the user device to display the graphical representation of the off-screen tile.

6. The computer-implemented method of claim 1, wherein calculating the measure of the amount of computing resources comprises monitoring resource usage during generation of the off-screen tile.

7. The computer-implemented method of claim 6, wherein monitoring resource usage comprises monitoring one or more of the following: CPU cycles, GPU cycles, time, power consumption, memory usage, network bandwidth, amount of network communication.

8. The computer-implemented method of claim 1, wherein the method is performed in its entirety by the user device.

9. The computer-implemented method of claim 1, wherein the method is performed at least partly by an intermediary system that operates as an intermediary between the user device and a site that hosts the content page.

10. The computer-implemented method of claim 1, further comprising reducing a resolution of the off-screen tile based at least partly on the calculated measure.

11. The computer-implemented method of claim 1, further comprising calculating a measure of visual impact associated with deferring an update to the off-screen tile, wherein selecting the timing with which to update the off-screen tile is based further on the measure of visual impact.

12. A system, comprising:
a computing system comprising a processor coupled to a memory, the memory including specific instructions that upon execution configure the computing system to at least:
identify a plurality of tiles of a content page requested by a user device;
identify an off-screen tile of the plurality of tiles, the off-screen tile corresponding to a portion of the content page that is outside a visible area of the user device;
calculate a probability that the off-screen tile will become visible on the user device based, at least partly, on (1) page scrolling actions performed on the user device and (2) past page scrolling behaviors performed by users on other user devices while accessing the content page;
select a timing with which to update the off-screen tile based at least partly on the probability that the tile will become visible; and
update the off-screen tile according to the selected timing.

13. The system of claim 12, wherein the computing system is further configured to calculate a cost of updating the off-screen tile, and to select the timing based additionally on the calculated cost.

14. A system, comprising:
a computing system comprising a processor coupled to a memory, the memory including specific instructions that upon execution configure the computing system to at least:
   identify a plurality of tiles of a content page requested by a user device;
   identify an off-screen tile of the plurality of tiles, the off-screen tile corresponding to a portion of the content page that is outside a visible area of the user device;
   calculate a probability that the off-screen tile will become visible on the user device based, at least partly, on page scrolling actions performed on the user device;
   select a timing with which to update the off-screen tile based at least partly on the probability that the tile will become visible; and
   update the off-screen tile according to the selected timing;
wherein the computing system is additionally configured to calculate a measure of visual impact associated with deferring an update to the off-screen tile, and to select the timing based additionally on the measure of visual impact.

15. The system of claim 12, wherein the computing system is configured to select the timing with which to update the off-screen tile at least partly by selecting an update frequency for updating the off-screen tile.

16. The system of claim 12, wherein the computing system consists of the user device.

17. The system of claim 12, wherein the computing system comprises an intermediary system that operates as an intermediary between the user device and a site that hosts the content page.

18. A non-transitory computer storage medium storing computer-executable instructions that direct a computing device to perform operations comprising:
   generating a plurality of tiles that collectively represent a visual representation of a content page requested by a user device, wherein different tiles correspond to different portions of the content page;
   identifying a damaged off-screen tile of the plurality of tiles, the damaged off-screen tile corresponding to a portion of the content page outside of visible area on the user device;
   calculating probability that the damaged off-screen tile will become visible on the user device;
   calculating a measure of visual impact associated with deferring an update to the damaged off-screen tile; and
   determining a timing with which to update the damaged off-screen tile based at least partly on the calculated probability and the measure of visual impact.

19. The non-transitory computer storage medium of claim 18, wherein the probability that the damaged off-screen tile will become visible is calculated based, at least partly, on user behavior information collected on the user device.

* * * * *